No. 737,690. PATENTED SEPT. 1, 1903.
M. WULFF.
COOLING APPARATUS.
APPLICATION FILED SEPT. 6, 1902.
NO MODEL.

Witnesses.
L. Waldman
C. Heymann

Inventor.
Marcus Wulff
by B. Singer Att'y.

No. 737,690. Patented September 1, 1903.

UNITED STATES PATENT OFFICE.

MARIUS WULFF, OF COPENHAGEN, DENMARK.

COOLING APPARATUS.

SPECIFICATION forming part of Letters Patent No. 737,690, dated September 1, 1903.

Application filed September 6, 1902. Serial No. 122,336. (No model.)

*To all whom it may concern:*

Be it known that I, MARIUS WULFF, bookseller, a subject of the King of Denmark, residing at Copenhagen, Denmark, have invented certain new and useful Improvements in Cooling Apparatus, of which the following is a specification.

The invention relates to a cooling apparatus of that type wherein liquid destined for cooling is led through the apparatus while cold water or other cooling liquid is caused to circulate constantly around its conduits.

The characteristic features of the present apparatus consist, partly, in that the cooling liquid is not, as usual, introduced from the exterior and drained off after passing through the apparatus, but, on the contrary, is contained within the apparatus itself and kept in constant motion therein, being continually returned to the upper part of the apparatus, where it is refrigerated by blocks of ice, and thereupon sinking down again into the lower part of the apparatus past the conduits therein, partly in that the liquid which is to be cooled can travel around the cooling apparatus proper from one side to the other and by placing a gate in the passage or by-path the quantity may be regulated in such a way as to mix, the whole body being cooled to the desired temperature. The continual circulation of the refrigerating liquid can be carried on by means of a pump placed on an exterior rising-pipe, while, however, even without this contrivance a continual circulation will take place—that is, a rising and falling of the refrigerating liquid on account of the different temperatures at top and at bottom.

Figure 1:
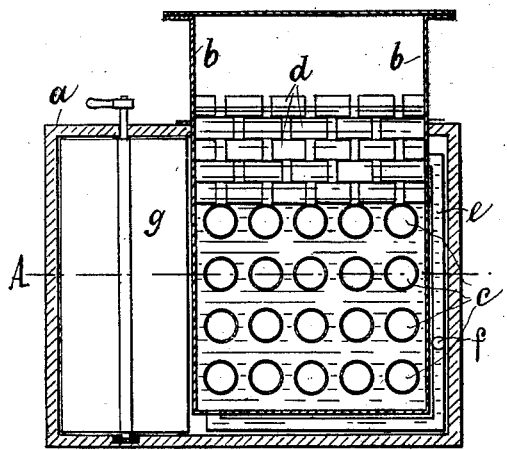
Figure 2:
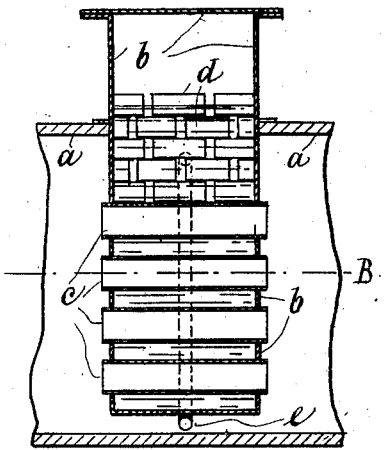
Figure 3:
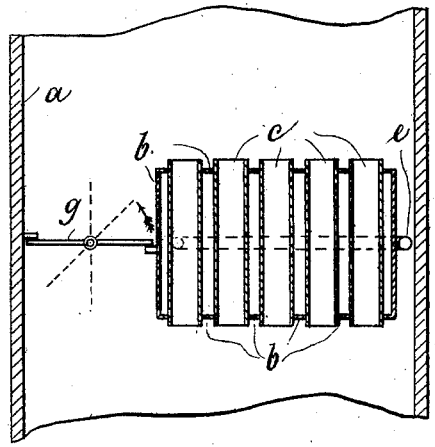
Figure 4:
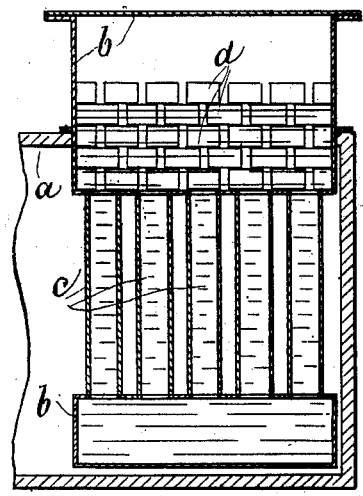

Referring to the drawings, Figure 1 is a vertical section through apparatus embodying my invention, in which the substance to be cooled is lowered in temperature partly by passing through pipes traversing the reservoir containing the refrigerating liquid and partly by passing around and in contact with said reservoir to reënter said pipes on the other side thereof. Fig. 2 is a vertical section, partly broken away and transverse to the foregoing, through said appparatus. Fig. 3 is a horizontal section on the line A B indicated in the two preceding figures, and Fig. 4 is a vertical section through an alternative form of the apparatus.

Referring now to said drawings, $a$ indicates a tank in which the reservoir $b$ for the reception as well of the cooling material as of conduits for the liquid to be cooled is placed. In the lower part of the said reservoir is a system of pipes or conduits $c$, which, as shown in Figs. 1 and 2, are placed horizontally and surrounded by water, or, as shown in Fig. 4, may be placed perpendicularly and be filled with water, while the liquid to be cooled circulates thereabout.

In the upper part of the reservoir are placed ice blocks $d$ for the refrigeration of the water, which latter on account of the changing and different temperature is kept in constant circulation in the interior of the apparatus itself. If a livelier circulation than the natural is wanted, a rising-pipe $e$ can, as mentioned, be provided, in which a pump (not shown) may be arranged, as at $f$, to face a stream from the bottom to the top of the reservoir $b$ and over the ice.

The water seeks or always returns to the lower part of the reservoir after having come in contact with the ice and can be used for refrigeration as long as ice remains in the upper part of the reservoir.

In order to be able to regulate the temperature of the cooled liquid, a gate $g$ is placed in the tank $a$ to one side of the reservoir $b$, the other side of said reservoir being close to the wall of the tank, as shown in Fig. 1. By opening this gate more or less, as indicated in Fig. 3, part of the cooled liquid passes around the reservoir after its exit from the conduits $c$ and mixes with that on the farther side to enter the conduits again, and as the proportion of mixture can be regulated by partly opening or closing said gate an even temperature may be obtained for the entire body of liquid being cooled.

Having now described my invention, what I claim as new, and desire to secure by Letters Patent, is—

1. In cooling apparatus, the combination of a tank, a receptacle located therein to one side thereof leaving a passage at the other, and having provision for the reception of a refrigerating agent at its top, conducting means for a cooling liquid confined in said receptacle, exposing said liquid to the action of the refrigerating agent and directing its circulation, and conducting means for the liquid to be cooled, opening from the receptacle toward both ends of the tank, whereby said liquid enters the receptacle from one end of the tank, passes therethrough to the other and circulates around through said passage.

2. In cooling apparatus, the combination of a tank, a receptacle located therein to one side thereof, leaving a passage at the other side, and having provision for the reception of a refrigerating agent at its top, conducting means for a cooling liquid contained in said receptacle, exposing said liquid to the action of the refrigerating agent and directing its circulation, conducting means for the liquid to be cooled, opening from the receptacle toward both ends of the tank so that said liquid may enter from one end of the tank, pass through the receptacle to the other end, and flow around through the passage to the first end, and a gate in said passage whereby such flow may be regulated.

3. In cooling apparatus, the combination of a tank containing the liquid to be cooled, a receptacle located therein to one side thereof, leaving a passage at the other, having provision for the reception of a refrigerating agent at its top and filled with a cooling vehicle, and a series of tubes passing transversely through the receptacle and opening at each end into the tank; whereby the liquid to be cooled passes from one end of the tank to the other through said tubes, and circulates around to the other end through said passage.

4. In cooling apparatus, the combination of a tank containing the liquid to be cooled, a receptacle located therein to one side thereof, leaving a passage at the other, receiving a refrigerating agent at its top and filled with a cooling vehicle, a pipe passing from bottom to top of the receptacle, a pump in said pipe for maintaining constant circulation of said vehicle, and conduits passing transversely through said receptacle to lead the liquid to be cooled therethrough from one end to the other of said tank.

In testimony whereof I affix my signature in presence of two witnesses.

MARIUS WULFF.

Witnesses:
HANS PEDERSEN,
YENS SCHMIDT.